March 12, 1957

C. F. HAMMOND 2,784,600

MANUAL AND POWER ACTUATED STEERING MECHANISM FOR MOTOR VEHICLES

Filed July 7, 1954

4 Sheets-Sheet 1

*INVENTOR.*
CHARLES F. HAMMOND
BY
Whittemore, Hulbert & Belknap
ATTORNEYS

March 12, 1957

C. F. HAMMOND 2,784,600

MANUAL AND POWER ACTUATED STEERING
MECHANISM FOR MOTOR VEHICLES

Filed July 7, 1954

4 Sheets-Sheet 3

INVENTOR.
CHARLES F. HAMMOND
BY
Whittemore, Hulbert & Belknap
ATTORNEYS

March 12, 1957

C. F. HAMMOND 2,784,600

MANUAL AND POWER ACTUATED STEERING MECHANISM FOR MOTOR VEHICLES

Filed July 7, 1954

4 Sheets-Sheet 4

INVENTOR.
CHARLES F. HAMMOND
BY
Whittemore, Hulbert & Belknap
ATTORNEYS

United States Patent Office 2,784,600
Patented Mar. 12, 1957

2,784,600

MANUAL AND POWER ACTUATED STEERING MECHANISM FOR MOTOR VEHICLES

Charles F. Hammond, Grosse Pointe, Mich., assignor to Gemmer Manufacturing Company, Detroit, Mich., a corporation of Michigan Application July 7, 1954, Serial No. 441,748

4 Claims. (Cl. 74—89)

Power steering mechanisms are usually incorporated in motor vehicles previously designed to include only manually operated steering mechanisms. As a consequence it frequently happens that the space available for installation of the power steering unit is very restricted and does not greatly exceed that required for the manually operated steering mechanism. It is, therefore, a primary object of the invention to obtain a construction of manually and power actuated steering unit which can be installed within such restricted space limits.

It is a further object to obtain a construction in which power actuation is initiated without load resistance, although during continuing operation resistance is built up which is always proportional to the load.

Still further, it is an object to obtain a simple construction of unit which can be manufactured at relatively low cost. With these objects in view the invention consists in the construction as hereinafter set forth.

Figure 1:
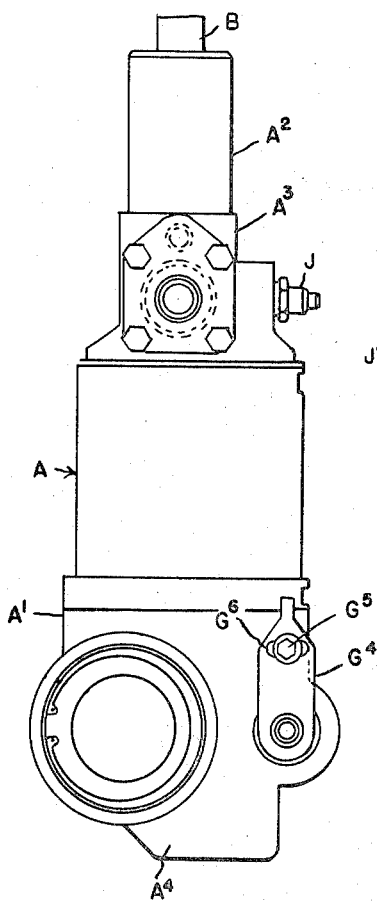
Figure 2:
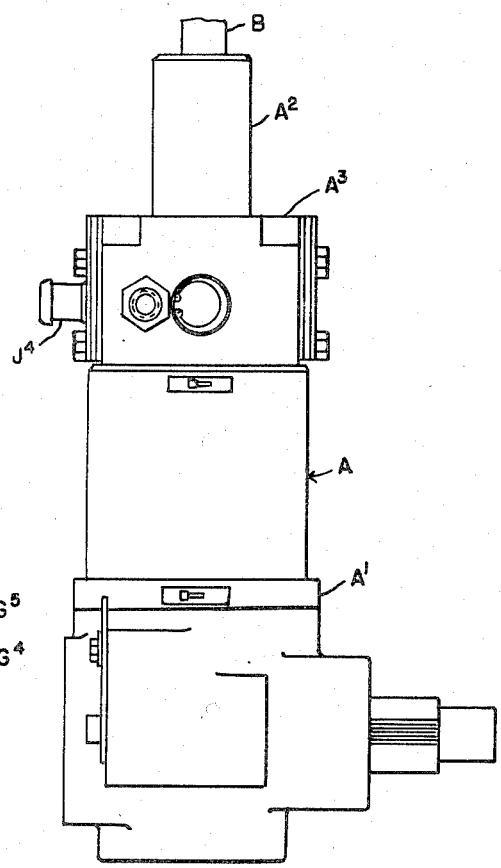
Figure 3:
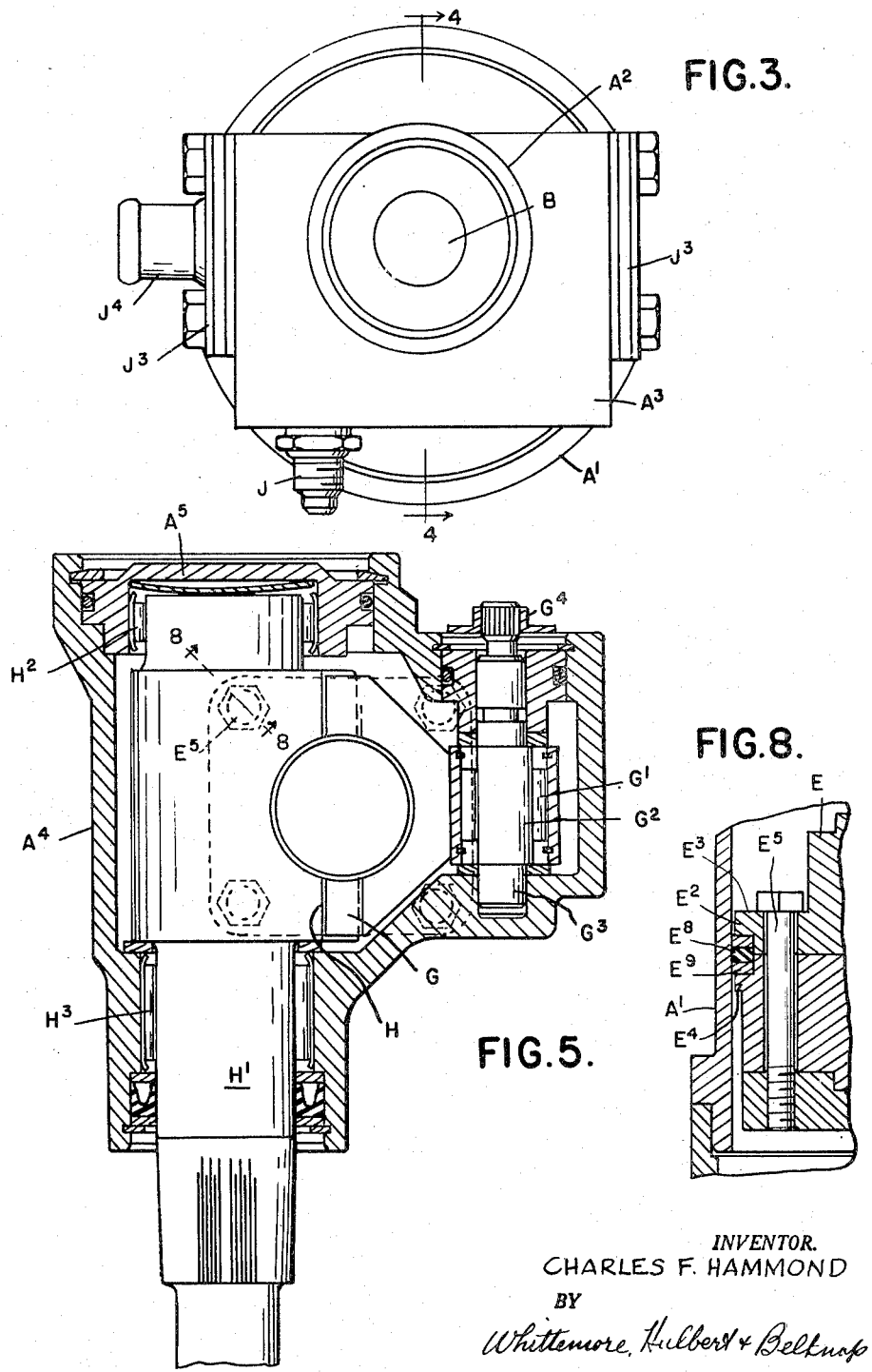
Figure 4:
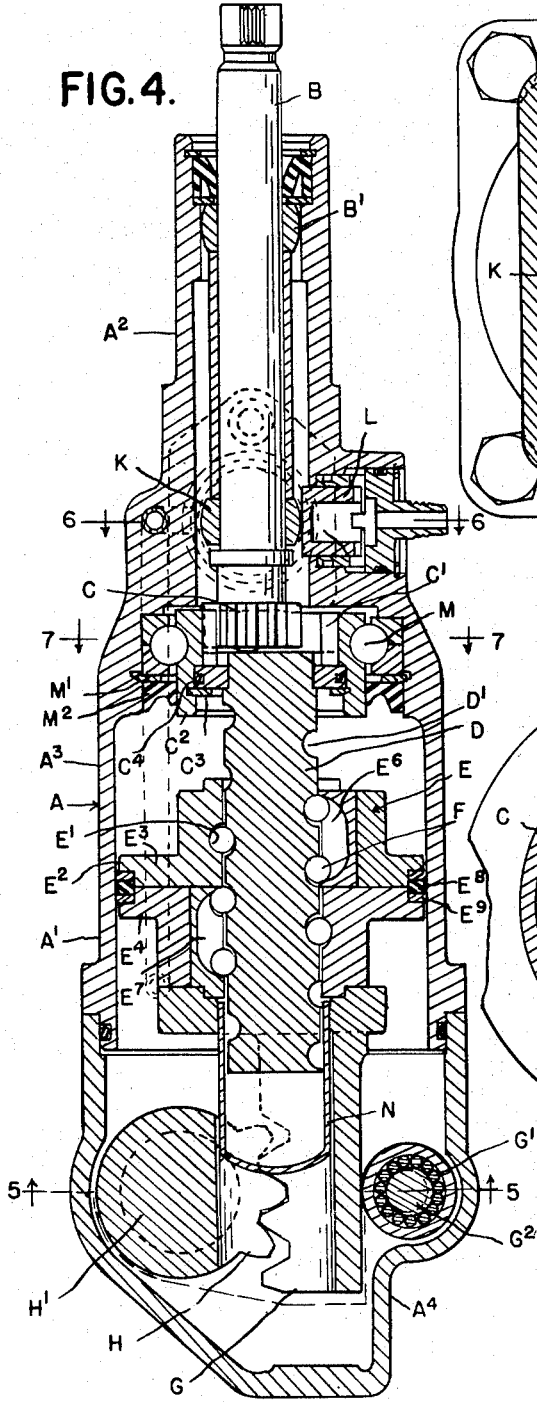
Figure 6:
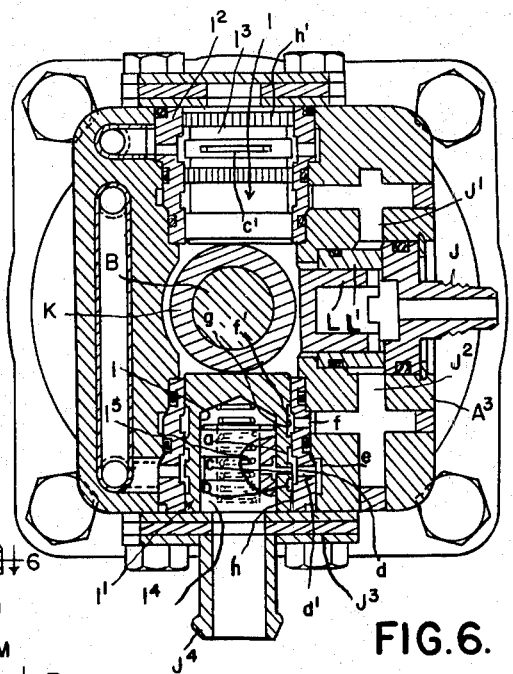
Figure 7:
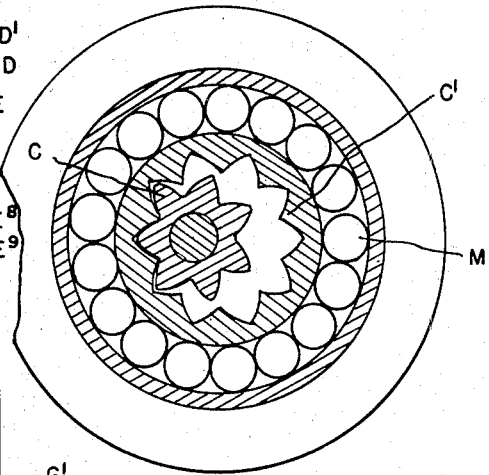
Figure 10:
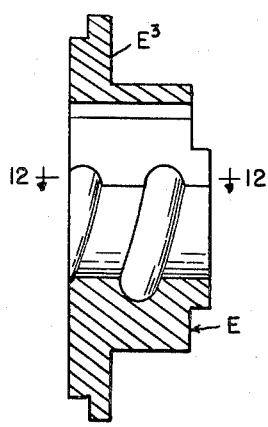
Figure 9:
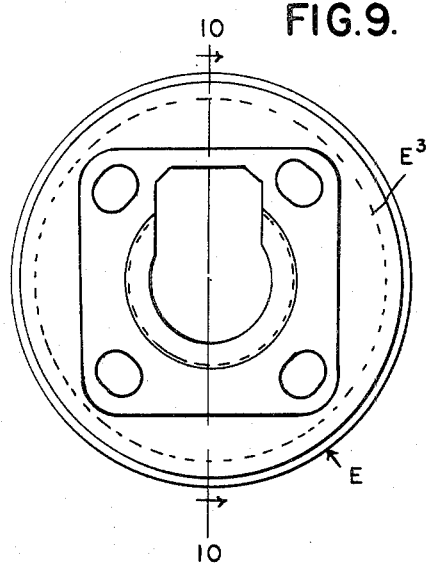
Figure 11:
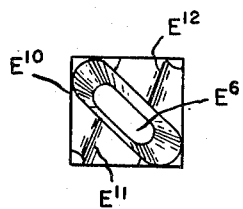
Figure 12:
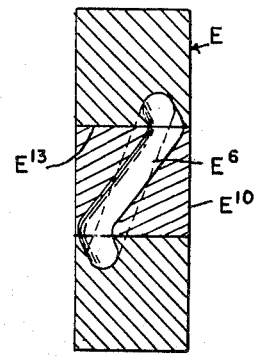

In the accompanying drawings:

Fig. 1 is a side elevational of the unit.
Fig. 2 is an elevation viewed at right angles to Fig. 1.
Fig. 3 is a plan view.
Fig. 4 is a longitudinal section on line 4—4 of Fig. 3.
Fig. 5 is a cross section on line 5—5 of Fig. 4.
Fig. 6 is a cross section on line 6—6 of Fig. 4.
Fig. 7 is a cross section on line 7—7 of Fig. 5.
Fig. 8 is a section on line 8—8, Fig. 5.
Fig. 9 is an elevation of one of the piston sections detached.
Fig. 10 is a cross section on line 10—10, Fig. 9.
Fig. 11 is a plan view of the insert.
Fig. 12 is a cross section of the assembled section and insert on line 12—12, Fig. 10.

The unit is designed to form the base of the steering column or post of the motor vehicle and is provided with suitable means (not shown) for attachment to the frame of the vehicle in which it is installed. It comprises a housing A having a substantially cylindrical lower portion A′ and an upper portion A² of small diameter adapted to receive the lower end of the tubular steering column. Between the portions A′ and A² is a portion A³ which houses the valve mechanism. In the portion A² there is installed a shaft B, which at its upper end is adapted for connection to the shaft of the steering wheel which extends downward through the column, these parts being of the usual construction and not illustrated. Near its upper end the shaft B has a spherical collar B′ thereon fitting within a cylindrical bearing in the housing portion A². At the lower end of the shaft is a small diameter gear wheel C which is in mesh with an internal gear wheel C′ of larger diameter. The axes of these two gears, while slightly offset from each other, are comparatively close so as to be in substantial alignment. The gear wheel C′ is connected to a shaft D extending downward through the housing portion A′, such shaft being formed with a helical groove D′ extending the length thereof. Surrounding the shaft D is a sleeve E having a corresponding helical groove E′ in its inner surface. Within these grooves D′, E′ are balls F which form a coupling therebetween so that rotation of the shaft D will through said balls impart an axial movement to the sleeve E. The latter is also provided with a return passage for the balls from one portion of the helical groove to another. The construction, including the elements D, E and F as thus far described, is an old and well known means for converting rotary to reciprocatory motion and vice versa. However, there are certain special and advantageous features of the construction which will be later explained. The sleeve E has a portion E² of larger diameter which constitutes a piston slidably engaging a cylinder formed by the housing portion A′. Depending from and connected to the sleeve E is a rack member G which is in mesh with a gear segment H on a transversely extending rock shaft H′. This rock shaft is adapted to receive a rock arm for actuating the portion of the steering mechanism below the vehicle body and which is not illustrated.

The construction as thus far described constitutes the force increasing transmission which in all manually operable steering gears is between the hand wheel and the mechanism for operating the dirigible ground wheels. However, the cylinder A′ and piston E² are portions of a hydraulic motor constituting the power actuating means which is confined within the same space limits required for the manual steering means. The valve means for controlling the motor is within the housing portion A³ and the only additional elements are the conduits connecting the motor to the pump of the hydraulic system.

The unit includes two separately organized portions, viz. (1) the valves with their actuating mechanism; and (2) the force increasing transmission which is housed within the motor. It is obvious that construction 1 might be used with the modified construction 2 and vice versa. Nevertheless there is a unique cooperation between constructions 1 and 2 for attaining the objects of the invention. Therefore, I shall fully describe herein both constructions but will specifically claim only construction 2.

Valve and operating means therefor

The housing portion A³ has a transverse bore therethrough intersecting the central longitudinal passage through which the shaft B extends. The valves I and I′ are respectively located in the portions of the bore on opposite sides of said shaft. Each valve includes a stationary sleeve or bushing member I² fitting the bore and a piston I³ slidable within the sleeve. Both the sleeve and piston have a plurality of spaced annular channels in their contacting faces, including in the piston channels $a$ and $b$ separated by a rib $c$. In the sleeve there is a channel $d$ of sufficient width to overlap the channels $a$ and $b$ in the neutral position of the valve. The channel $d$ is connected by radial ports $d'$ with an annular channel $e$ in the portion A³ surrounding the sleeve. This channel $e$ connects with a passage leading to one end of the cylinder in the portion A′, the passages from the two valves leading to opposite ends of the cylinder. Pressure fluid from the hydraulic circuit (not shown) enters through a nipple J and divides, passing through channels J′ and J² to the respective valves I and I′ and to an annular channel $f$ surrounding each sleeve I². From this channel the fluid flows through radial ports $f'$ in said sleeve to a registering channel $g$ in the piston. The latter channel is separated from the channel $a$ by a rib which, however, is corrugated to permit flow of fluid to the channel $a$ and from the latter through the channel $d$ and ports $d'$ to the channel $e$. The channel $b$ has on its outer side a corrugated rib $h$ which permits flow of fluid from said channel to the space at the end of the piston. Heads J³ close the opposite ends of the bore through the portion A³ in which the valves are located and one of these heads is provided with a nipple J⁴ for connection with the return circuit (not shown). There are also passages (not shown) which connect the annular spaces at the outer ends of each valve with the nipple J$^4$. Each piston valve I$^3$ has a cylindrical recess $i$ therein which fits a recessed plug I$^4$ bearing against the head J$^3$. A light spring I$^5$ in the recess in the plug bears against the inner end of the piston and presses the same against a collar K on the shaft B. There is also an elongated port $c'$ in the rib $c$ which admits fluid under pressure to the cylindrical recess $i$ within the piston I$^3$ creating an unbalanced pressure on said piston. Thus, when the shaft B is in normal position the valves I and I' will be in neutral, at which time fluid from the inlet nipple J flows continuously through each valve to the outlet nipple J$^4$. If, however, the valves are displaced from neutral by movement of the shaft B and collar K, as will be later described, one valve will close its fluid inlet and the other valve its fluid outlet, thereby causing flow of fluid to one end of the cylinder in the portion A' and exhausting fluid from the opposite end of said cylinder.

As has been previously described rotation of the shaft B in either direction is communicated to the shaft D through the medium of the external gear wheel C and internal gear wheel C'. The shaft B is, however, pivotally mounted at B' so that the gear wheel C has freedom for movement in any direction. This freedom is restricted in one direction by a piston member L having its axis in the horizontal plane of the section, Fig. 6, and engaging a cylindrical sleeve L' in a transverse bore through the portion A$^3$. The piston is under hydraulic pressure and bears against the collar K to yieldably press the gear wheel C into mesh with the gear wheel C'. It will, however, yield to permit a planetary movement of the gear wheel C with respect to the gear wheel C' while maintaining the two in mesh. Thus, whenever the manually operated steering wheel (not shown) is rotated in one direction or the other from its neutral position the gear wheel C will either rotate the gear wheel C' or move a slight distance planetarily with respect to the latter gear wheel. Inasmuch as there is always resistance to rotation of the gear wheel C' by the load of the steering mechanism, the initial movement of the gear wheel C will be plenetary and through the collar K will operate the valves I and I'. Initially there is no resistance to such planetary movement but as it continues the collar K must displace the piston L against hydraulic pressure. Also, the restricting of the exhaust port of one of the valves and the restricting of the inlet port of the other valve unbalances the pressures from said valves against the collar K tending to return the valves and shaft B to neutral position. This return pressure is always proportional to the total steering load, such for instance as 20%. The hydraulic pressure of the fluid acting upon the piston L is the same as that in the motor so that the pressure holding the gears C and C' in mesh will always be greater than any torque reaction of said gears tending to force them out of mesh.

*Motor and force increasing transmission unit*

As above described the sleeve E forms a piston in the cylinder of the housing portion A' and as also described the displacement of the valves I and I' from neutral position will admit hydraulic pressure fluid to the cylinder on one side of the piston and exhaust the fluid from the opposite side. More in detail the construction is as follows:

The internal gear wheel C' is mounted on a ball bearing M located in a recess at the upper end of the housing portion A'. There is also an extension C$^2$ of the gear wheel C' which forms a torque transmitting coupling to the shaft D. A snap ring C$^3$ holds the parts thus engaged and a snap ring M' holds the ball bearing M in position. There are also sealing rings C$^4$ and M$^2$ which prevent escape of fluid under pressure from the upper chamber of the cylinder A'. The rack G is held in engagement with the gear segment H by a roller bearing G' sleeved upon an eccentric portion G$^2$ of a rotatively adjustable pin G$^3$ in the housing. The outer end of the pin G$^3$ is connected to a lever G$^4$ which may be angularly adjusted to move the roller G' against the rack G to compensate for any wear. The lever is locked in position by a headed clamping screw G$^5$ passing through a slot G$^6$ in the lever.

Thus far the sleeve E which also constitutes the piston has been described as a single member having an internal helical groove E'. In reality it is formed of a pair of sections E$^3$ and E$^4$ which abut each other in the central plane of the piston portion E$^2$ and are rigidly secured by clamping bolts E$^5$. The reason for this construction is to permit slight rotary adjustment of one of the sections E$^3$, E$^4$ with respect to the other. Another feature of the construction is that the cross section of the complementary helical grooves D' and E' is greater than the diameters of the balls. This would result in rotary lost motion between the shaft D and the sleeve E if it were not for the relative adjustment of the sections E$^3$ and E$^4$. However, by making such adjustment the balls in the section E$^3$ will be forced thereby upward against the upper edge of the groove D' in the shaft D while the balls in the lower section E$^4$ will be forced downward against the lower edge of the groove D' in said shaft. This will prevent any lost motion either axially or rotatively between the members D and the member E as a unit. One great advantage of such construction is that it is unnecessary to form the helical grooves D' and E' with close tolerance with respect to the balls F. On the contrary they may be made of an appreciably greater radius than the radius of the ball while at the same time all lost motion is taken up by relative adjustment of the sections E$^3$ and E$^4$. It also eliminates the necessity of grinding such grooves which may be merely machined before heat treatment and hardening. A further feature is that a return passage for the balls is provided in each of the sections E$^3$ and E$^4$. Thus, as illustrated in Fig. 4, the return channel E$^6$ is formed in the section E$^3$ between adjacent convolutions of the helical groove and in like manner the return channel E$^7$ is formed in the section E$^4$ between adjacent convolutions of the helical groove. The peripheral sealing of the piston in the cylinder A' may be formed by a resilient ring E$^8$ with rigid rings E$^9$ on opposite sides thereof, all in a peripheral groove formed in the portion E$^2$. The piston portion E$^2$ does not bear against the wall of the cylinder but is guided by engagement of the sleeve E with the shaft D.

The return channels E$^6$ and E$^7$ might be made in an integral portion of the corresponding section but this would be a very difficult structure to manufacture. I have, therefore, placed these channels in separate inserts engaging recesses in the sections. Each of these inserts E$^{10}$ is substantially rectangular in a plane normal to a radial place of the section and engages an open ended recess E$^{13}$ extending longitudinally of said section. The inner face of the member E$^{10}$ is fashioned to fit about the shaft D and has shoulder portions E$^{11}$ and E$^{12}$ which abut against opposite sides of the helical groove D' in said shaft. Thus, the insert will be compelled to travel axially with the section in which it is placed and without the necessity of any fastening means therebetween. The return channel, such as E$^6$, extends diagonally across the member E$^{10}$ transverse to the rib between adjacent convolutions of the helical groove D'. It also extends diagonally between adjacent convolution portions of the helical groove in the section and is complementary thereto. This forms an endless channel, the portions of which together form a single convolution in the section about the axis of the shaft and through which the balls are free to travel in either direction.

It has been stated that the rack member G is connected to the lower end of the member E to engage the gear segment H. However, the length of the shaft member D is such as to extend completely through the member E and downward beyond the same when said member is at the upper end of its movement in the cylinder A'. This would break the seal of the piston as hydraulic fluid would be free to pass through the clearance in the helical grooves D' and E' from one side to the other. To avoid such effect I have provided a hollow extension N of the member E sealed thereto and adapted to receive the lower end portion of the shaft D when the piston is in the upper end of the cylinder. This extension may be made of sheet metal only slightly larger in diameter than the shaft D. To avoid interference between this extension N and the rack G and gear segment H, these are bifurcated to extend on opposite sides of said extension. Thus, as shown the engagement between the rack and gear section is increased in transverse width which better takes care of any torque stresses between said members. To facilitate assembly of the parts the shaft H' with its gear segment H is mounted in a separate housing section A⁴ connected to the lower end of the portion A'. The shaft and gear are inserted through an opening at one side of the section A⁴ with a portion of the shaft extending out through an opposite opening for connection to a rock arm. A cap A⁵ closes the entrance opening for the shaft and bearings H² and H³ support the shaft near its opposite ends. The roller bearing G' and associated members are also mounted on the section A⁴.

While in the above I have described a specific construction of valve means and operating mechanism therefor, it is obvious that the construction of motor and force increasing transmission might be used with modified constructions of valving means, and my invention includes such modification within its scope.

What I claim as my invention is:

1. In a transmission mechanism of the type comprising a shaft and a surrounding sleeve having complementary helical grooves in their adjacent faces, balls in said grooves, and a return channel for the balls in said sleeve between opposite ends of the helical grooves therein; a construction in which said complementary helical grooves in both said shaft and sleeve are of greater cross sectional radius than that of said balls and said sleeve is formed in two sections in longitudinal series, said sections having abutting end portions of greater radius forming a piston, said sections also being relatively adjustable rotatively about their common axis to contact the balls with opposite edges of the helical grooves in the respective sections and with opposite edges of the complementary helical groove in said shaft, thereby taking up all lost motion, said sections being locked in adjusted position, a cylinder surrounding the entire structure with its axis coincident with that of said shaft and together with said piston forming elements of a reciprocatory motor, said shaft being in rotatable and longitudinally fixed connection with said cylinder.

2. A construction as in claim 1 having a rock shaft extending into said cylinder transversely of its axis, the rock shaft having a gear segment thereon and a rack connected to said piston in mesh with the gear segment constituting an actuating connection, the piston sleeve having a recessed downward extension for receiving the shaft with the helical groove when said piston is at the upper end of its movement, said rack and gear segment being bifurcated to embrace and avoid interference with said extension in the downward movement of said piston.

3. The construction as in claim 1 having a housing connected to the lower end of said cylinder, a rock shaft extending into said housing transverse to and at one side of the axis of said shaft, a gear segment on said rock shaft, and a rack secured to and depending from said sleeve in mesh with said gear segment.

4. In a manually and power actuated power steering mechanism, the construction as in claim 2 having a shaft in the manually operated mechanism, a torque transmission between the latter shaft and said helically grooved shaft including an internal gear connected to the one and an external gear within and intermeshing with said internal gear connected to the other with freedom for limited planetary movement of one gear about the other in response to torque reaction of the load, and valve means actuated by said planetary movement controlling said motor.

References Cited in the file of this patent
UNITED STATES PATENTS

| | | |
|---|---|---|
| 465,099 | Rice | Dec. 15, 1891 |
| 583,802 | Hartwig | June 1, 1897 |
| 623,816 | Olsen | Apr. 25, 1899 |
| 2,195,799 | Parsons | Apr. 2, 1940 |
| 2,450,282 | Jackson | Sept. 28, 1948 |
| 2,605,854 | MacDuff | Aug. 5, 1952 |
| 2,618,166 | Douglas | Nov. 18, 1952 |